United States Patent [19]
Sanga

[11] 3,835,796
[45] Sept. 17, 1974

[54] EXHAUST SMOKE PURIFYING APPARATUS FOR INCINERATORS

[76] Inventor: Yasuhiro Sanga, 19-26, 5-chome, Shakujii-cho, Nerimaku, Tokyo, Japan

[22] Filed: Dec. 13, 1973

[21] Appl. No.: 424,217

[52] U.S. Cl. ............ 110/119, 55/222, 55/223, 55/227, 55/244, 55/257, 55/269, 261/116, 261/117, 261/DIG. 9, 261/DIG. 54
[51] Int. Cl. .............................. B01d 47/06
[58] Field of Search ......... 55/93, 94, 222, 223, 227, 55/229, 257, 260, 244, 269; 261/115–118, DIG. 9, DIG. 54, 17; 110/8 R, 18 R, 119

[56] References Cited
UNITED STATES PATENTS
2,688,943  9/1954  Wickland ........................... 110/119
3,572,264  3/1971  Mercer ........................... 261/DIG. 9
3,797,204  3/1974  Cavatassi ....................... 261/DIG. 4

*Primary Examiner*—Bernard Nozick
*Attorney, Agent, or Firm*—Whittemore, Hulbert & Belknap

[57] ABSTRACT

An exhaust gas cleaner for incinerators comprising a horizontal purifying duct horizontally extending from an incinerating furnace and provided with internal spray nozzles for spraying water in the direction of flow of the exhaust smoke, a vertical duct and provided with internal spray nozzles for upwardly spraying water and also internal spray nozzles for downwardly spraying water, the top portion of the vertical cleaner duct being provided with a baffle purifier, and a drain tank provided below the vertical purifying duct.

4 Claims, 8 Drawing Figures

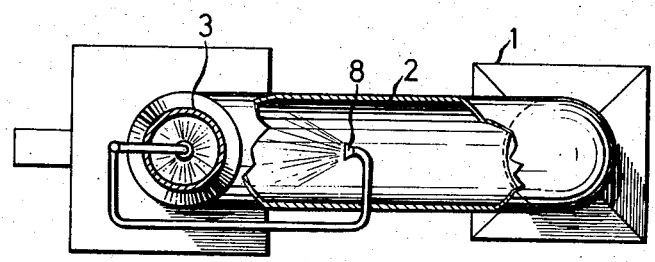
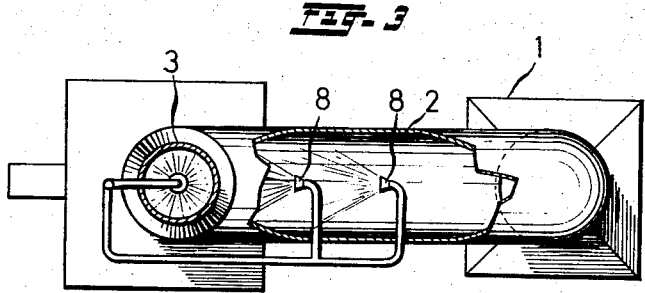
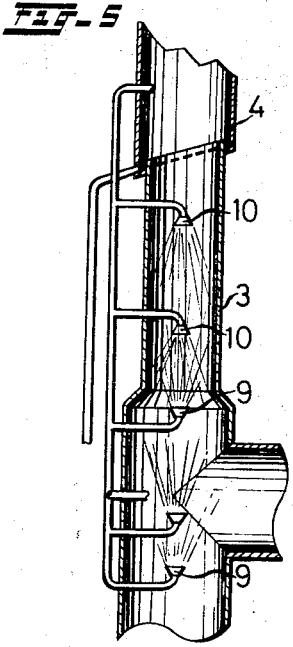
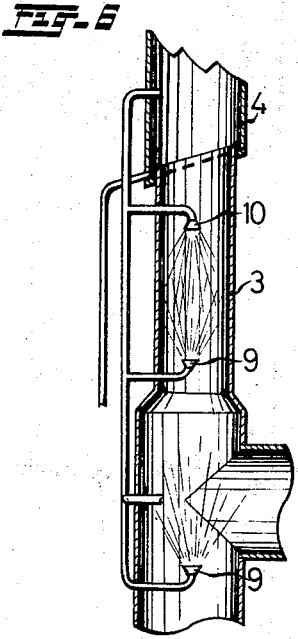

EXHAUST SMOKE PURIFYING APPARATUS FOR INCINERATORS

BRIEF DESCRIPTION OF THE DRAWING:

FIG. 3 is a partially cutaway view showing another embodiment of the horizontal purifying duct;

FIG. 4 is a view similar to FIG. 3 showing still another embodiment.

FIG. 5 is a partially cutaway view of another embodiment of the vertical purifying duct;

FIG. 6 is a view similar to FIG. 5 showing still another embodiment;

DETAILED DESCRIPTION OF THE INVENTION

This invention relates to apparatus for purifying exhaust smoke produced from incinerators for incinerating such industrial waste material as tires, rubber, plastics, etc. by removing posionous gas and soot and dust through washing with water.

It is well known that burning up of rubber, tire, symthetic resins and the like waste materials is accompanied by the generation of a great quantity of nasty and harmful exhaust smoke. Although there have been proposed various measures to solve this public contamination problem, there is still no decisively effective measure at present.

The present invention seeks to provide an effective solvation to this problem, and it has for its object the provision of an exhaust smoke purifier, which is simple in construction and capable of effectively removing poisonous matter off the exhaust smoke.

Figure 1:
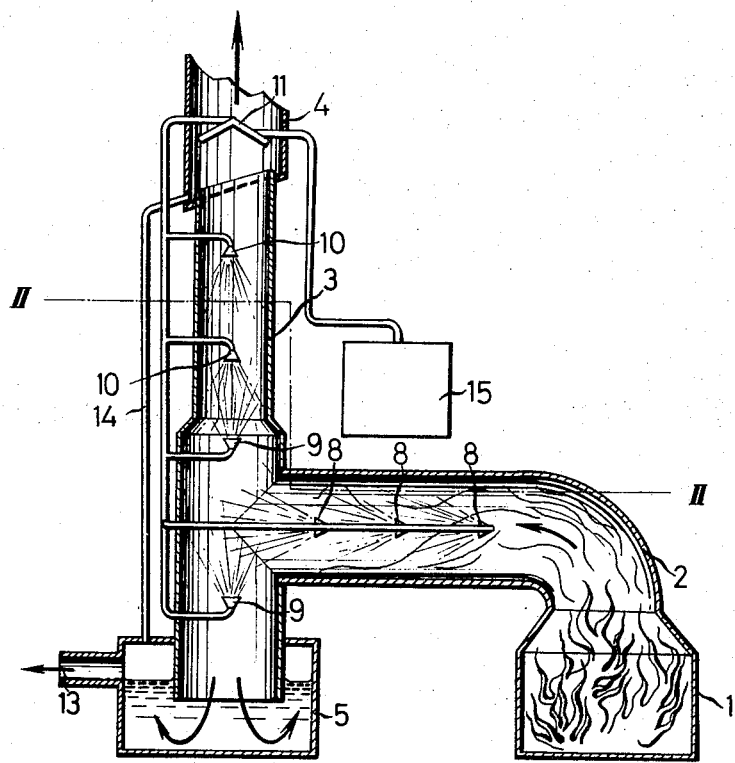
FIG. 1 is a elevational view in section of an exhaust smoke purifying apparatus for incinerators according to the present invention.
Figure 2:
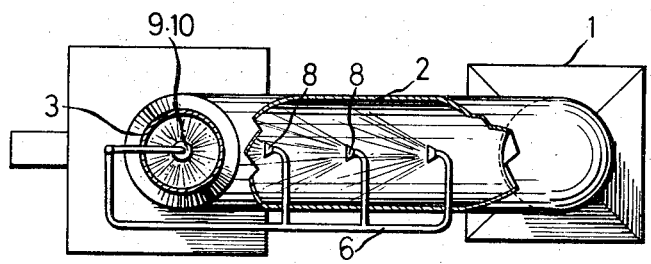
FIG. 2 is a top view in section taken on line II—II of FIG. 1.

The present invention will now be described in conjunction with some preferred embodiments thereof with reference to the accompanying drawing. Referring now to FIGS. 1 and 2, reference numeral 1 designates an incinerating furnace. The smoke produced in the furnace 1 and containing poisonous gas or soot or dust is caused to flow into a horizontal purifying duct 2 horizontally extending from the furnace 1. The exhaust smoke entering the horizontal purifying duct 2 is cooled by water sprayed from spray nozzles 8 in the direction of progress of it as it is guided in the direction of spraying.

The exhaust smoke having been cooled down and guided by water issuing from the spray nozzles 8 within the horizontal purifying duct 2 enters a vertical purifying duct 3. The vertical purifying duct 3 vertically branches from the horizontal purifying duct 2. Its portion extending upwardly from the horizontal purifying duct 2 has an inner diameter smaller than that of the horizontal purifying duct 2 and is provided with an internal spray nozzle 9 and also internal spray nozzles 10 providing spray in the opposite direction to that of the spray nozzle 9. The other protion of the vertical purifying duct 3 extending downwardly from the horizontal purifying duct 2 is provided with an internal spray nozzle providing spray in the upward direction, and its lower end is connected to a drain tank 5. The exhaust smoke entering the vertical purifying duct 3 is upwardly forced by the spray from the spray nozzles 9. However, its upward progress is disturbed by the spray from the spray nozzles 10. Also, the reduced inner diameter constitutes another disturbing factor. Thus, a turbulent state is set up, and part of the smoke turning into downward direction falls. At this time, the soot and dust in the smoke also fall together with water droplets. In this way, the exhaust smoke is purified, with part of it going upward through the vertical purifying duct and the rest guided downwardly. It will be appreciated that the effect of purifying the exhaust smoke getting out of the horizontal purifying duct 2 into the vertical purifying duct 3 is promoted by the turbulent state brought about due to the afore-mentioned reduced diameter and spray nozzles 10 extremely restricting the progress of the smoke and causing the turning of part of the smoke to the downward direction.

The purified smoke having upwardly proceeded against the spray in the opposite direction and containing moisture enters a top duct 4 of a inner diameter greater than that of the duct 3, in which gas and water are separated as the smoke strikes a conical or pyramiddal buffer purifier 11. The buffer purifier 11 has a double wall structure, and its interior is filled with cool water. The separated water falls on the bottom of the top duct 4 and is drained through a drain duct 14 into a drain tank 5. A water tank 15 is provided for supplying water to the spray nozzles and the buffer purifier.

The exhaust smoke caused to turn to fall due to the reduced diameter of the vertical purifying duct 3 and the spray nozzles 10 under the turbulent state contains water droplets and drops into the purifying and draining tank 5 disposed below the vertical purifying duct 3.

The purifying and draining tank 5 is filled with water to a constant water level. A drainage dam 16 is provided so that always a constant water level can be maintained even if droplets fall through the vertical purifying duct 3. The lower end of the vertical purifying duct 3 is located below the water level in the purifying and draining tank 5. Thus, the exhaust smoke having descended through the vertical purifying duct 3 enters the water in the tank and purified therein before it is exhausted from exhaust outlet 3.

FIGS. 3 and 4 show different embodiments of the spray nozzle arrangement within the horizontal purifying duct 2. The arrangement of FIG. 3 consists of two spray nozzles, while the arrangement of FIG. 4 consists of a single spray nozzle. The location and number of spray nozzles may be suitably changed according to the capacity of the furnace and other factors.

FIGS. 5 and 6 show different embodiments of the spray nozzle arrangement in the vertical purifying duct 3. It will be seen that the location, number and orientation of the spray nozzles may be suitably changed according to the air flow and other conditions.

Figure 7:
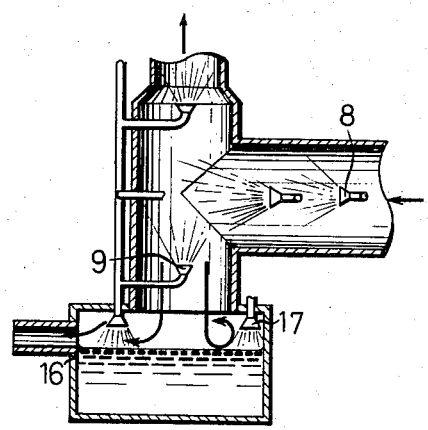
FIG. 7 is a segmentary section view showing one embodiment of the drain tank.
Figure 8:
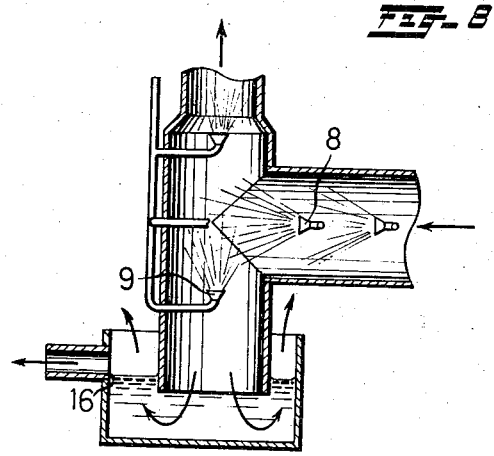
FIG. 8 is a segmentary section view showing another embodiment of the drain tank.

FIGS. 7 and 8 show different embodiments of the purifying and draining tank 5.

In the FIG. 7, the lower end of the vertical purifying duct 3 is not located within the water in the tank. In this embodiment, however, spray nozzles 17 are provided at the ceiling of the purifying and draining tank 5, so that the smoke having descended from above is further purified by the spray from these nozzles. Here, a constant water level is again maintained by a drainage dam 16.

In the FIG. 8, the lower end of the vertical purifying duct 3 is located within water in the tank 5, so that the smoke having descended from above and containing water droplets enters water against the resistance thereof and is completely purified before it is exhausted. Again here, a constant water level is maintained by a drainage dam 16.

As has been described in the foregoing, with the construction according to the present invention the smoke produced from the incinerating furnace 1 is caused to proceed through the vertical cooling and purifying duct 2, where it is driven by the spray from the spray nozzles 8 spraying water in the direction of progress of it and is also deprived of soot and dust by the spray. The preliminarily purified exhaust smoke is further purified in the vertical purifying duct 3, where the purifying effect is further promoted due to the reduced diameter of the duct and arrangement of spray nozzles providing spray in opposite directions as shown in FIG. 1. Part of the purified exhaust smoke enters the top duct 4, where it is deprived of moisture by the conical buffle purifier 11, so that entirely clean gas is exhausted into atmosphere.

Further, the descending smoke through the vertical purifying duct 3 enters the purifying and draining tank 5 against the spray from the upwardly directed spray nozzles 9 for further purification, so that only entirely clean gas is exhausted into atmosphere.

With the above construction and effect according to the invention the purifying function and guiding function can be obtained only with the spray nozzles without providing any withdrawing means. Thus, the apparatus is very economical since no fan or like withdrawing means is needed and the drive force therefor is saved.

Also, without any power driven element the construction is very simple, and the maintenance of the equipment can be done very inexpensively.

Further, the exhaust smoke having cooled, preliminarily purified and guided through the horizontal cooling and purifying duct 3 by the spray and entering the vertically branching vertical purifying duct 3 is conveniently rendered into the turbulent state therein due the spraying of water in opposite directions and reduced diameter of the duct, so that occasion of contact of soot, dust or the like with the sprayed water is increased to enable perfect purification.

Furthermore, the perfectness of purification is aided by the provision of the buffle purifier on top of the vertical purifying duct 3 and the purifying and draining tank therebelow. Thus, the purifying apparatus according to the invention can serve as very effective measure for solving the presently controversial public contamination problem.

What is claimed is:

1. An exhaust smoke purifying apparatus for incinerators comprising;

a horizontal cooling and purifying duct horizontally extending from an incinerating furnace and provided with one or more internal spray nozzle spraying water in the direction of the flow of the exhaust smoke;

a vertical purifying duct vertically branching from said horizontal cooling and purifying duct at the down-stream end thereof, the upper portion of said vertical purifying duct extending upwardly from the lower portion of the vertical purifying duct and being reduced in inner diameter with respect to the horizontal cooling and purifying duct and the vertical purifying duct being provided with at least one internal spray nozzle upwardly spraying water and at least one internal spray nozzle downwardly spraying water;

a top duct provided on top of said vertical purifying duct and having an internal baffle purifier means; and a purifying and draining tank provided below said vertical purifying duct.

2. The exhaust gas purifying apparatus according to claim 1, therein said baffle purifier means provided in the top duct has a conical or pyramiddal double-wall structure and is filled with cool water.

3. The exhaust gas purifying apparatus according to claim 1, wherein the water surface in said purifying and draining tank is held at a constant level and spaced a constant distance from the lower end of said vertical purifying duct and purifying water is sprayed from above said tank toward the water surface.

4. The exhaust gas purifying apparatus according to claim 1, wherein the lower end of said vertical purifying duct is located within water in said purifying and draining tank, the water surface in said tank being held at a constant level.

* * * * *